Nov. 8, 1960   LYDIE KOCH BORN MIRAMOND ET AL   2,959,733
HALL EFFECT MAGNETOMETER
Filed Dec. 29, 1958                             2 Sheets-Sheet 2

INVENTORS
LYDIE KOCH
GÉRARD LAMBERT
BY

United States Patent Office 2,959,733
Patented Nov. 8, 1960

2,959,733
HALL EFFECT MAGNETOMETER

Lydie Koch, born Miramond, and Gérard Lambert, Paris, France, assignors to Commissariat a l'Energie Atomique, Paris, France, a society of France Filed Dec. 29, 1958, Ser. No. 783,244

Claims priority, application France Dec. 30, 1957

7 Claims. (Cl. 324—45)

The present invention relates to an apparatus for measuring with a high accuracy magnetic inductions and more particularly a given component of the magnetic induction vector at a given point.

Such an apparatus may be used for mapping the magnetic field in the air-gap of an electro-magnet and/or for permanently determining the field of an electro-magnet.

By way of indication it may be pointed out that such an apparatus makes it possible to measure a magnetic induction ranging from 500 to 10,000 gauss with an accuracy and a stability corresponding to a maximum relative error of $10^{-4}$ and that it is suitable for instance for mapping the field in the deflector magnets of a particle accelerator, such as a linear accelerator or a synchrotron, or for permanently supervising the field of an electro-magnet of a particle accelerator of the cyclotron or Van de Graaff generator type.

The magnetic field measurement apparatus or magnetometer according to the invention is based upon the measurement of the Hall voltage U which is produced in a conductor or semi-conductor substance placed in a magnetic induction field B and through which passes a current I, the vectors I and B being perpendicular to each other, the Hall voltage being given by the formula $$U = KBI \tag{1}$$

in which K is a characteristic constant of the substance that is considered.

By way of explanation, we have shown in Fig. 1 a semi-conductor crystal 1 having a high K coefficient (in order to increase the accuracy of the measurements), placed in a magnetic field B (at right angles to the plane of the drawing) and through which passes a current I applied by means of two current feed electrodes 2 and 3, the Hall effect voltage U being collected in an open circuit by means of two Hall electrodes 4 and 5.

The known magnetometers making use of the Hall effect are used by measuring, on the one hand in open circuit the voltage U by opposing it to a fraction $k_1$ of the voltage of a source of current having an extremely stable electromotive force E, and on the other hand in closed circuit the intensity I by measuring the potential difference V across a resistance R through which current I passes, the measurement of V being preferably also made by opposition to a fraction $k_2$ of voltage E. The formulas $U = k_1 E$ and $V = RI = k_2 E$ make it possible to deduce U and I from the known values of E and R and from the measured values of $k_1$ and $k_2$. From these values of U and I and from that of K determined by a preliminary calibration of the apparatus in a known magnetic field $B_0$, Formula 1 makes it possible to determine B.

Such known magnetometers require a very great stability of the electromotive force E and of the source which sends current through the semi-conductor crystal, so that the calibration in a known field $B_0$ can apply to the measurement of the unknown field B, which measurement is effected at a later time and so that E and I do not vary between the measurement of U and the measurement of $V = RI$.

A magnetometer of this known type is diagrammatically shown by Fig. 2. Semi-conductor 1 is fed with current I (through electrodes 2 and 3) in series with a resistance 6 of value R, from a source 7 which is carefully stabilized both as to voltage and to current, because the resistance r between electrodes 2 and 3 actually varies with the induction B.

The values of U and V are measured by opposition, for instance as shown, by means of a common system including a source of current 8 having a very stable electromotive force E (the value of which is very often compared to that of a calibrating battery), a potentiometer 9 with its sliding contact 9c, a zero galvanometer 10, a double switch C making it possible to oppose to a fraction of voltage E, either the potential difference V between the terminals 6 through which passes current I (position in solid lines of switch C), or the Hall voltage U between electrodes 4 and 5 (position in dotted lines of switch C).

The apparatus of Fig. 2 makes it possible to measure, at a time $t_1$, the voltage U by placing switch C in the dotted line position and moving sliding contact 9c until galvanometer 10 indicates zero. At this time, the sliding contact 9c is in the position shown in dotted lines and collects the fraction $k_1$ of the value $E_1$ at the time $t_1$ from the electromotive force E; therefore $U = k_1 E_1$. As for the measurement of V, it takes place at a time $t_2$ by placing the switch C in the position shown in solid lines and moving the sliding contact 9c until galvanometer 10 again indicates zero; at this time, sliding contact 9c is in the position shown in solid lines and collects a fraction $k_2$ of the value $E_2$ of the electromotive force E at time $t_2$; therefore $V = k_2 E_2$.

Since K is known from preliminary measurements in a known magnetic field:

$$B = \frac{U}{KI} = \frac{UR}{KV} = \frac{R}{K} \cdot \frac{k_1 E_1}{k_2 E_2}$$

With an accuracy depending upon the stability of the electromotive force E $$E_1 = E_2 \text{ and } B = \frac{R}{K} \cdot \frac{k_1}{k_2}$$

Consequently if the stability of E and also that of source 7 are supposed to be satisfactory, the main causes of errors are:

The error on the value of resistance R;
The error on K, that is to say the error of calibration of of source E;
The error on $k_1$, that is to say on the measurement of voltage U;
The error on $k_2$, that is to say on the measurement of voltage V.

These causes of errors make it necessary, if it is desired to measure an induction B with an accuracy corresponding to a maximum relative error of $10^{-4}$, to have a source of current 7 and a source of auxiliary voltage 8 stable with an approximation of $10^{-5}$, which makes the apparatus very expensive.

The object of the present invention is to provide a Hall effect magnetometer which is free from this drawback.

For this purpose, in an apparatus according to the invention, the Hall voltage generated in a semi-conductor placed in the field B to be measured and through which passes a current I, which Hall voltage is proportional to B and I, is directly opposed to a difference of potential also substantially proportional to I, collected from a high accuracy potentiometer through which passes a current substantially proportional to I.

The Hall effect magnetometer according to the invention is therefore characterized by the fact that it comprises, in combination, an element of a semi-conductor substance on which are applied two feed electrodes and two Hall voltage collecting electrodes, a single source of current, a potentiometer including a resistance having two terminals and a sliding contact, circuit elements for connecting the source of current with said potentiometer terminals and said feed electrodes so as to pass, through said element and said potentiometer, respective currents substantially proportional to each other, and means for comparing the potential difference between said Hall voltage collecting electrodes and a variable difference of potential collected between said sliding contact and one of said potentiometer terminals.

Preferred embodiments of the present invention will be hereinafter described with reference to the accompanying drawings, given merely by way of example and in which:

Figs. 1 and 2 are explanatory drawings already referred to.

Figure 1:
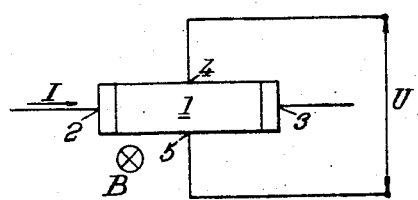
Figure 2:
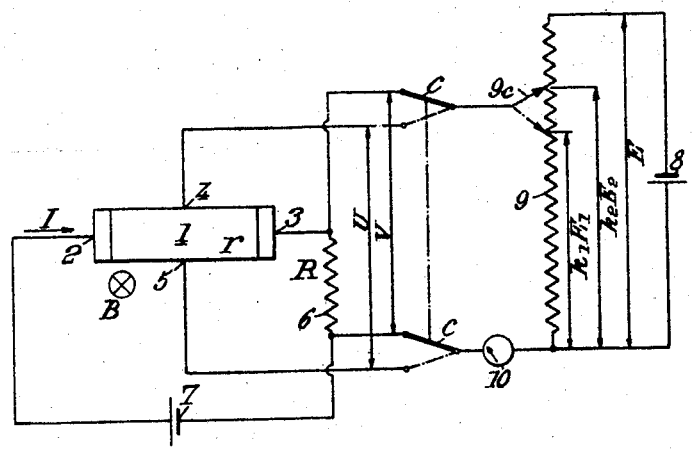
Figure 3:
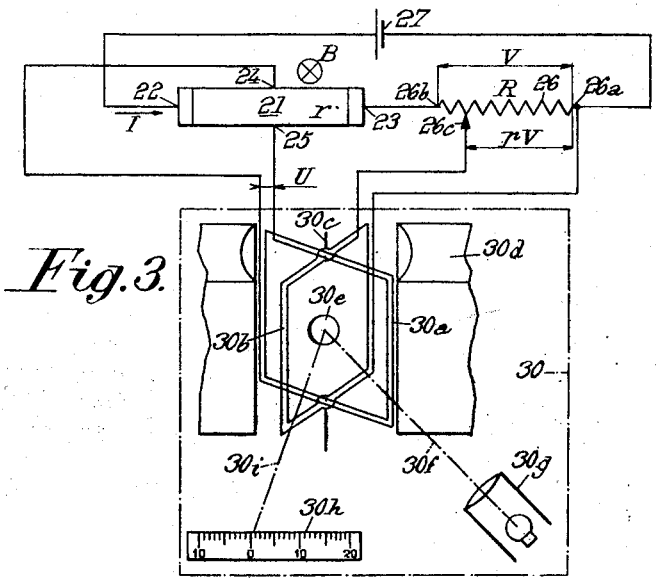
Fig. 3 shows a first embodiment of a magnetometer according to the invention, in which the same currents flow through the semi-conductor element and the potentiometer, these two elements being fed in series from the single source of current.

In Fig. 3 we have shown a semi-conductor crystal 21, consisting for instance of germanium, silicon, indium antimonide, indium arsenide, carrying two feed electrodes 22 and 23 and two Hall voltage collecting electrodes 24 and 25, this element 21 being placed in the magnetic field the induction B of which, normal to the plane of the drawing, is to be measured. The thickness of crystal 21 in a direction perpendicular to the plane of the drawing is very small.

The current I flowing through element 21 is supplied by a source of current 27, one of the terminals of which is connected with electrode 22 and the other terminal of which is connected with one of the terminals 26a of a potentiometer 26 (preferably of the Helipot type), the other terminal 26b of said potentiometer being connected with the electrode 23 of the semi-conductor element 21. Due to this series arrangement, the same current I flows through element 21 and potentiometer 26. According to the invention we compare, in a comparator device 30, the Hall voltage U, collected by electrodes 24 and 25, with a fraction $pV$ of the voltage V between the terminals 26a and 26b of potentiometer 26 of resistance R, this variable voltage being collected by means of sliding contact 26c.

The comparison apparatus 30 may of course be of different forms and it may be constituted, for instance as shown, by a moving coil differential galvanometer including a first coil 30a fed with the voltage U and a second coil 30b perpendicular to coil 30a and receiving voltage $pV$, the whole of these two coils being mounted rotatable between two torsional wires 30c in the magnetic field of a magnet 30d. The whole of the coils 30a and 30b carries a small mirror 30e which reflects the light beam 30f, supplied from a light source 30g, onto a gradutated scale 30h. When voltages U and $pV$ are equal to each other, mirror 30e occupies its position of rest and the reflected beam 30i is directed onto graduation 0 of scale 30h. Therefore, in the state of equilibrium, we have $pV=U=KBI$ with $V=RI$, therefore $pR=KB$ or $$B=\frac{R}{K}p$$

coefficient $p$ ranging from 0 to 1 and $$\frac{R}{K}$$

being determined by means of a preliminary calibration in a magnetic field of known induction $B_0$ without it being necessary to determine the value of R with a high accuracy.

Thus B is proportional to $p$, which makes it possible to make the graduations of the potentiometer directly in magnetic inductions. The measurement of B is on the other hand independent of I and does not make use of an auxiliary voltage source. It follows that the single current source 27 need not be stabilized with a very high accuracy. It is generally sufficient to have a stability of 1% for source 27 in order to determine induction B with a maximum relative error of $10^{-4}$. Thus, instead of two sources 7 and 8 stabilized so that the relative error is less than $10^{-5}$ in the case of the prior magnetometers, a magnetometer according to the present invention requires, in order to obtain the same final accuracy, a single current source 27 stabilized with an approximation of $10^{-2}$, which permits a considerable economy.

Figure 4:
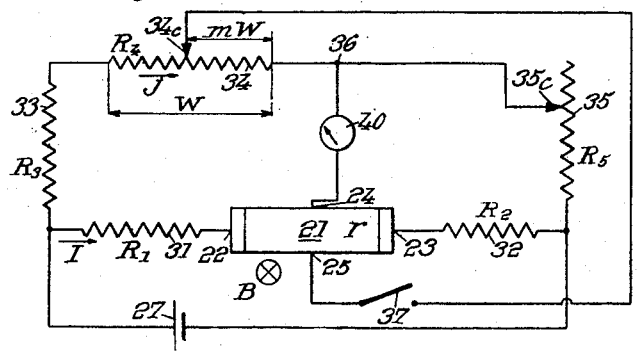
Fig. 4 shows another embodiment in which a Wheatstone bridge type circuit is used to effect the comparison between the Hall voltage and the voltage collected from the potentiometer.

In the embodiment of Fig. 4, the currents flowing through the semi-conductor element and the potentiometer (respectively I and J) are no longer equal but merely proportional to each other and use is made, in order to determine the equality between the Hall voltage and a fraction of the voltage drop across the potentiometer, of a measurement bridge circuit of the Wheatstone type instead of a differential galvanometer.

The semi-conductor crystal 21 is disposed at the center of the bridge and it is fed with a current I from a current source 27, in series with two auxiliary resistances 31 and 32 of values $R_1$ and $R_2$ respectively.

In shunt with the whole of 31, 21 and 32, there is disposed a series arrangement including a resistance 33, a graduated measurement potentiometer 34 and a balancing potentiometer 35 the respective resistances of which are $R_3$, $R_4$ and $R_5$ (the values corresponding to the total resistances for the potentiometers). Element 35 acts as an adjustable resistance.

Furthermore, the Hall electrode 24 is connected, through a zero galvanometer 40, to the point 36 located between potentiometers 34 and 35, whereas the other Hall electrode 25 is connected, through a switch 37, with the sliding contact 34c of potentiometer 34.

The operation of the apparatus of Fig. 4 is as follows:

Switch 37 being first opened, the sliding contact 35c of potentiometer 35 is moved until galvanometer 40 gives zero indication. Points 36 and 24 are then at the same potential and:

$$(R_1+ar+bKB)I=(R_3+R_4)J \qquad (2)$$

In this formula:

$r$ and $ar$ indicate the resistance respectively between electrodes 22 and 23 and between 22 and 24, $a$ being substantially equal to ½ but varying somewhat with B and the geometry of crystal 21; and $bKB$ is a corrective factor which depends upon the induction B; $b$, same as $a$, is close to ½ and depends upon the geometry of the crystal and the positioning of the Hall electrodes 24 and 25.

Switch 37 is then closed and the sliding contact 34c of potentiometer 34 is moved in order to return the indications of galvanometer 40 to zero. At this time, the difference of potential between the Hall electrodes 24 and 25, which is equal to KBI, exactly balances the voltage drop $mW$ across the portion of the potentiometer 34 located on the right hand side of sliding contact 34c (of course $m$ ranges from 0 to 1). Therefore:

$$mR_4J=U=KBI \qquad (3)$$

Combining Formulas 2 and 3 makes it possible to eliminate the ratio $I/J$ and to obtain:

$$mR_4 = KB \cdot \frac{R_3 + R_4}{R_1 + ar + bKB} \quad (4)$$

It is easy to calculate $R_1$ so that the variation of the ratio $$\frac{K}{R_1 + ar + bKB}$$

(in which $a$ depends upon B) as a function of induction B is negligible. In these conditions, there is a substantial proportionality between I and J on the one hand and between B and $m$ on the other hand, for all values of B, and Equations 2 and 4 may be written:

$$R_1 I = (R_3 + R_4) J \quad (2')$$

$$B = \frac{R_4 R_1}{K(R_3 + R_4)} \cdot m = K' m \quad (4')$$

It will therefore be seen that, the ratio $K'$ having been determined by a preliminary calibration measurement in a known induction $B_0$, it is possible directly to graduate the position of the sliding contact $34c$ of potentiometer 34 in gauss.

In the example illustrated by Fig. 4, the respective resistances have the following values in ohms: $R_1 = 20$; $R_2 = 2$; $R_3 = 1$; $R_4 = 25,000$; $R_5 = 100,000$.

With such resistances and with a crystal of indium arsenide, it is possible, with a current I averaging from 0.1 to 0.2 ampere, to measure inductions ranging from about 500 and about 10,000 gauss with an accuracy and a stability corresponding to a maximum relative error of $10^{-4}$.

When it is desired to have a high accuracy, it is advisable to take some precautions in order to remedy the influence of a variation of temperature. As a matter of fact, a rise of temperature produces on the one hand a reduction of coefficient K, therefore of the Hall voltage $U = KBI$, and on the other hand a variation of the resistivity $r_0$ of the semi-conductor substance and consequently of the resistance $r$ of crystal 21. Two cases are to be considered.

($a$) Resistivity $r_0$ decreases when the temperature increases, and in this case it is possible to provide a value $R_2$ for resistance 32 giving an exact compensation of the effects due to a variation of the coefficient K and of resistance $r$, because if $e$ is the electromotive force of source 27 we have:

$$U = KBI \text{ and } e = (r + R_1 + R_2) I$$

so that:

$$U = \frac{K}{r + R_1 + R_2} Be \quad (5)$$

As K and $r$ vary in the same direction as a function of the temperature, it is possible to manage in such manner that the ratio $$\frac{K}{r + R_1 + R_2}$$

is substantially independent of the variations of temperature within a given range;

($b$) The resistivity $r_0$ increases when the temperature increases, so that the effects of the increase of $r$ and of the reduction of K add their action upon the Hall voltage, as it results from Formula 5.

Figure 5:
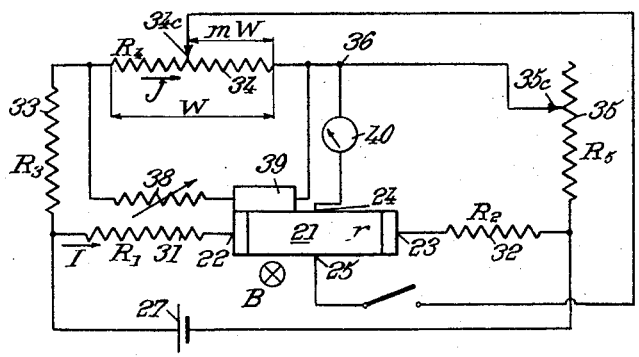
Fig. 5 shows another embodiment in which temperature compensating means is provided.

However, it is possible simultaneously to compensate for these two variations of K and $r$ by means of a compensation circuit, for instance of the type shown in Fig. 5, which is identical to Fig. 4 except for said compensation circuit, which is mounted in parallel with respect to potentiometer 34 and comprises an adjustable resistance 38 intended to achieve the adjustment of the compensation, and a resistance 39 having a negative temperature coefficient, this last mentioned resistance being closely applied against crystal 21, in such manner as to be at the same temperature as said crystal. As a portion of the current J passes through circuit 38, 39, the voltage across the portion of potentiometer 34 which is located on the right hand side of the sliding contact $34c$ (fraction $mW$) remains equal to the Hall voltage U for a suitable adjustment of resistance 38, without it being required to displace the sliding contact $34c$ of potentiometer 34.

A magnetic field and induction measurement apparatus according to the invention has considerable advantages over the prior apparatus making use of the Hall effect. Among these advantages, the following ones may be cited:

The measurements are independent of small variations of I, so that it is possible to have a feed which is stabilized with a maximum relative error of 1% (instead of $10^{-5}$ with prior apparatus);

It is not necessary to have a source 8 of auxiliary voltage E, which should also be stable with an approximation of $10^{-5}$;

The accuracy of the measurements may be higher than those obtained with prior apparatus: it is limited only by the stability of the resistances and the linearity of the measurement potentiometer (26 or 34);

The measurement operations are considerably simplified;

It is possible to make an apparatus with direct reading, without lowering the precision below that corresponding to a maximum relative error of $10^{-4}$;

The cost of the apparatus is reduced by the value of the stabilized feeds and can thus be easily divided by a factor averaging ten;

There are no drawbacks over those inherent in conventional Hall effect magnetometers (necessity of having a calibrating resistance which is very stable and also a measurement potentiometer which is very stable and accurate, the calibrating resistance constituting the resistance of the potentiometer in a magnetometer according to the invention).

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A magnetometer which comprises, in combination, a semi-conductor element, two current supply electrodes mounted on said element, two Hall effect collecting eletrodes mounted on said element, a single source of current, a potentiometer including a resistance having two terminals and a sliding contact movable along said resistance, circuit means arranged to connect said source of current with said terminals and said current supply electrodes so as to pass through said semi-conductor element and through said potentiometer resistance respective currents at least substantially proportional to each other, and means for comparing the potential difference between said Hall effect collecting electrodes with the potential difference between said sliding contact and one of said terminals.

2. A magnetometer which comprises, in combination, a semi-conductor element, two current supply electrodes mounted on said element, two Hall effect collecting electrodes mounted on said element, a single source of current, a potentiometer including a resistance having two terminals and a sliding contact movable along said resistance, said semi-conductor element and said resistance being mounted in series with said source, and means for comparing the potential difference between said Hall effect collecting electrodes with the potential difference between said sliding contact and one of said terminals.

3. A magnetometer according to claim 2 in which said comparing means is constituted by a differential galvanometer.

4. A magnetometer which comprises, in combination, a semi-conductor element, two current supply electrodes mounted on said element, two Hall effect collecting electrodes mounted on said element, a single source of current, a potentiometer including a resistance having two terminals and a sliding contact movable along said resistance, said semi-conductor element and said potentiometer resistance being connected in parallel with said source of current so as to pass through said semi-conductor element and through said potentiometer resistance respective currents at least substantially proportional to each other, and bridge circuit means for comparing the potential difference between said Hall effect collecting electrodes with the potential difference between said sliding contact and one of said terminals.

5. A magnetometer which comprises, in combination, a semi-conductor element, two current supply electrodes mounted on said element, two Hall effect collecting electrodes mounted on said element, a single source of current, a potentiometer including a resistance having two terminals and a sliding contact movable along said resistance, said semi-conductor element and said potentiometer resistance being connected in parallel with said source of current, a resistance of a value great as compared to that of said element inserted in series between said source and said element, an adjustable resistance connected in series between said source and said potentiometer, circuit means, including a switch, inserted between one of said Hall effect collecting electrodes and said potentiometer sliding contact, and circuit means, including a zero galvanometer inserted between the other Hall effect collecting electrode and a point of the connection between said adjustable resistance and said potentiometer.

6. A magnetometer according to claim 5 in which the semi-conductor element has a resistance which decreases when the temperature increases, this magnetometer further including a resistance mounted in series with said semi-conductor element and of a value such that the sum of the resistance of said semi-conductor element and of the resistances mounted in series therewith varies, as a function of the temperature, substantially in the same manner as the Hall coefficient of the semi-conductor element.

7. A magnetometer according to claim 5 in which the semi-conductor element has a resistance which increases when the temperature increases, this magnetometer further including, in parallel with said potentiometer, an arrangement in series of an adjustable resistance and a negative temperature coefficient resistance, the latter resistance being closely applied against said semi-conductor element.

References Cited in the file of this patent

UNITED STATES PATENTS 2,562,120    Pearson --------------- July 24, 1951